Jan. 20, 1959 — C. D. MITCHELL — 2,870,065
PROCESS AND APPARATUS FOR DISTILLATION
Filed July 11, 1955 — 3 Sheets-Sheet 1

INVENTOR.
CHARLES DUNCAN MITCHELL
BY
ATTORNEY

Jan. 20, 1959     C. D. MITCHELL     2,870,065
PROCESS AND APPARATUS FOR DISTILLATION
Filed July 11, 1955     3 Sheets-Sheet 2

INVENTOR
Charles Duncan Mitchell
by Benj. T. Fauber
his attorney

United States Patent Office 2,870,065
Patented Jan. 20, 1959

2,870,065

PROCESS AND APPARATUS FOR DISTILLATION

Charles Duncan Mitchell, New Oscott, England, assignor to Dunlop Rubber Company Limited, London, England, a British company Application July 11, 1955, Serial No. 521,321

Claims priority, application Great Britain July 15, 1954

12 Claims. (Cl. 202—46)

This invention is concerned with a process and apparatus for distillation and especially with the removal of unconverted monomers from crude polymers, such as synthetic rubber latices.

In the emulsion polymerisation of vinyl monomers and in their copolymerisation with each other or with conjugated dienes it is sometimes necessary to remove residual unpolymerised monomers. This is particularly the case in the production of synthetic rubber latices where it is usual to attain a degree of conversion of only 60 to 70%. For economic reasons, as well as from considerations of the quality of the product, it is necessary to recover the residual monomers which are then blended in suitable proportions with fresh monomers and re-used.

The recovery of an unconverted volatile monomer such as butadiene, isoprene or chloroprene, when used as the sole monomer, may be effected simply by flashing off as a result of venting to lower pressure at room or slightly elevated temperatures or under controlled conditions of vacuum. This operation does however require a plant of considerable size since the flash tanks wherein the monomer is vented must normally be of substantially high capacity, e. g. about five times the volume of the latex contained in them at any one instant, and the rate of introduction of latex is comparatively slow.

The recovery problem becomes more difficult in cases where the polymer is obtained by a co-polymerisation of, for example, a highly volatile monomeric diolefine, such as butadiene, with a less volatile vinyl monomer, such as styrene, acrylonitrile, methyl isopropenyl ketone, or vinyl pyridine. For the recovery of the less volatile monomers it is necessary to subject the crude polymer latex to steam distillation at reduced pressure. This aggravates the tendency of the latex to froth and makes very difficult the efficient separation of the monomer-water distillate from the latex even where a distillation column equipped with perforated plates is used. The tendency to frothing tends to cause a carry-over of the froth with the distillate and thus to prevent satisfactory separation of the monomer and water into separate layers.

My invention provides a process and apparatus for efficient removal of volatile monomers with less tendency for the polymer to be carried over with the distillate.

According to my invention a process for the stripping of residual monomers from crude polymers of the kind in which the crude polymer is subject to the counter-current flow of steam in a distillation column maintained under reduced pressure comprises mixing part of the total steam required for stripping with the crude polymer in a vessel separated from, but communicating with, the distillation column and also maintained under reduced pressure, the mixture then being conducted to the top of the distillation column wherein it meets the remaining quantity of steam necessary for stripping of the monomers in counter-current flow.

Preferably, the steam and crude polymer are introduced separately into the mixing vessel in such a manner that the incoming streams enter the vessel at spaced apart positions facing each other.

According to a further feature of the invention, apparatus for carrying out the stripping process above described comprises a distillation column having steam inlet means at the foot thereof and an imperforate top plate with liquid transfer means adapted to be sealed with liquid, a conduit for introducing a mixture of steam and crude polymer into the chamber above the top plate and a conduit connecting the said chamber with the remainder of the column, the ends of the two said conduits within the said chamber being adjacent the wall of the chamber and directed thereon.

In a preferred form of the apparatus a mixing vessel is provided having inlets for steam and crude polymer and a conduit connecting the mixing vessel with the chamber above the top plate of the distillation column.

The upper end of the conduit connecting the top chamber with the remainder of the column is also preferably joined to the conduit connecting the mixing vessel with the top chamber, thereby providing a common discharge conduit having its outlet adjacent the inner wall of the said chamber and directed thereon.

A preferred form of apparatus for carrying out the stripping process referred to in the preceding paragraphs comprises a mixing vessel, means for introducing steam and crude polymer separately into said vessel by means of pipes having facing openings spaced apart, a distillation column of the perforated plate type with a top imperforate plate of shallow funnel shape spaced at a distance corresponding to a few plate intervals from the top of the column and having a transfer conduit for liquid adapted to be sealed with liquid, steam inlet means at the foot of the distillation column, means for conducting the mixture of steam and crude polymer from the mixing vessel to an entry point in the distillation column above the imperforate top plate for discharge against the walls of the column, a pipe projecting through said top plate and connecting with said mixture conducting means, a condenser, a receiving vessel or vessels connected with said condenser, means for conveying distillate from the column to the condenser and means for effecting reduced pressure conditions in the distillation column and the mixing vessel.

The invention will be fully understood from the following description of a number of embodiments thereof, which will be given with reference to the accompanying drawings wherein.

Figure 1:
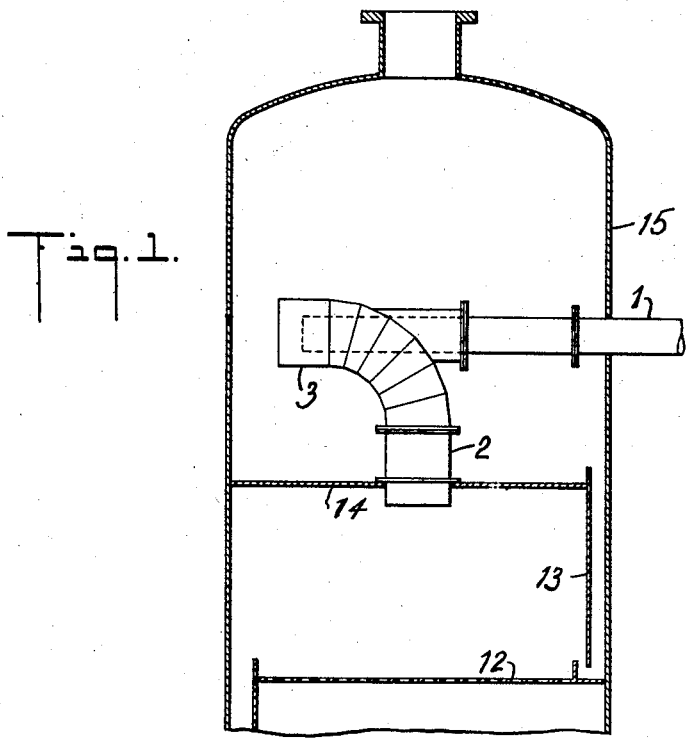
Figure 1 is a section through a T-piece for introducing the mixture of latex and steam into the distillation column.
Figure 2:
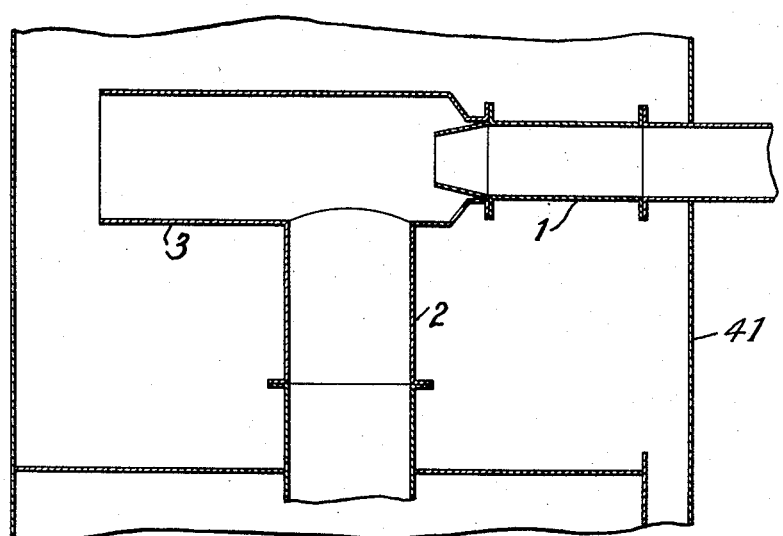
Figure 2 is a section through another form of T-piece.

The means connecting the mixing vessel with the top chamber of the distillation column preferably takes the form of a pipe or conduit arranged to conduct the mixture of crude polymer and steam across the interior of the chamber so that the mixture impinges on the side of the chamber and the impact assists in breaking up the foam. Also, this pipe or conduit is preferably connected to the upper end of the conduit connecting the top chamber with the remainder of the column, normally a pipe passing through the imperforate top plate. The two pipes may be joined in the form of a simple T-piece or the T-piece may be arranged as in Figures 1 or 2. In these figures, when the T-piece is fitted in the distillation column, pipe 1 is connected to the mixing vessel, pipe 2 passes through the imperforate top plate and pipe 3 is directed against the inner wall of the column. It will be seen that in the forms shown in Figure 2 the mixture entering the apparatus through pipe 1 serves to assist the ascent of distillate and foam through pipe 3.

Figure 3:
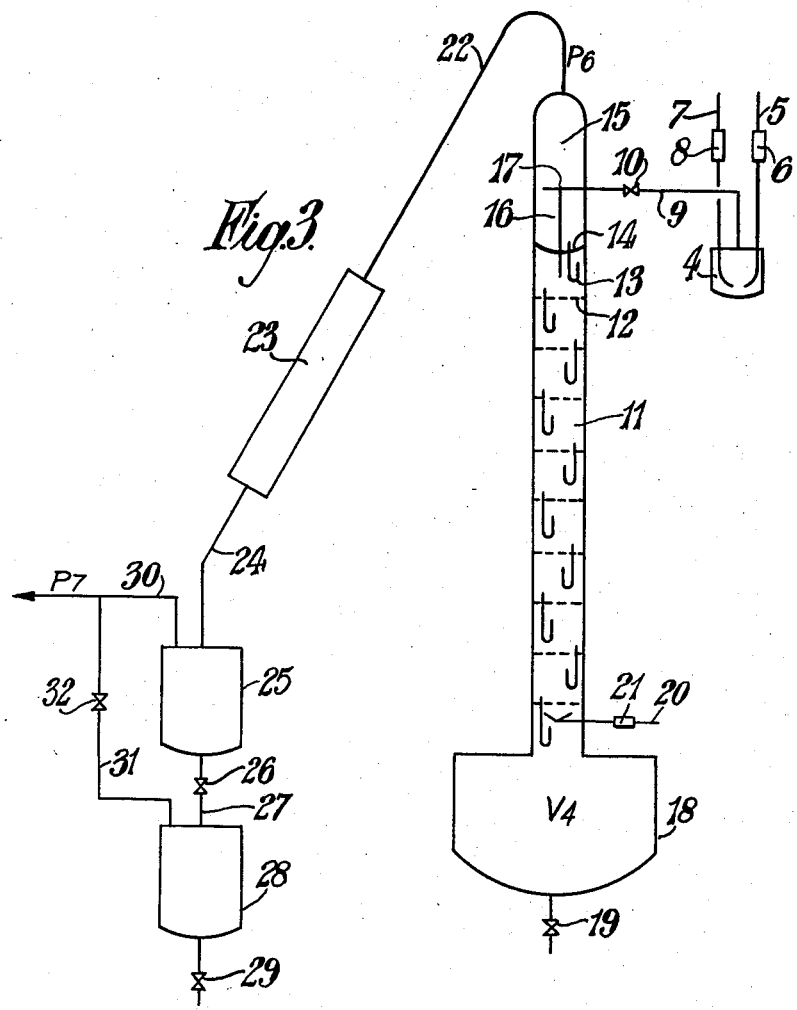
Figure 3 is a diagrammatic representation of one form of apparatus for removal of residual monomer from crude polymer latex and Figure 4 is a diagram of the lay-out of a plant for stripping styrene from crude butadiene-styrene copolymer latex.

Referring now to Figure 3, this is a diagrammatic representation of an apparatus for removing residual monomer from crude polymer latex and is especially suitable for stripping butadiene and styrene from crude latex formed by their copolymerisation in an aqueous medium. In the figure the missing vessel 4 is provided with two feed pipes, viz. a latex feed pipe 5 fitted with a flow meter 6 and a steam pipe 7 fitted with a flow meter 8. Pipes 5 and 7 terminate within vessel 4 in openings which face one another. Vessel 4 is connected by pipe 9 via valve 10 to a distillation column 11. In Figure 3 the column is shown fitted with a series of perforated plates 12, each provided with a liquid transfer conduit or downcomer pipe 13 in the form of a U-piece, but any other type of plate can be used, such as bubble-cap plates, while simple packings, such as Raschig rings, can also be used instead of plates. The top plate 14, which is situated at a distance corresponding to about three plate intervals from the top of the column, is in the form of a dish or shallow funnel and, although provided with a downcomer 13, is imperforate, thereby forming a chamber 15 at the top of the column which is sealed off from the remainder thereof. A pipe 16 passes through the centre of plate 14 and its upper end meets pipe 9 to form a T-piece 17, the free end of which is directed against the side of chamber 15. This can be a simple T-piece or it can have either of the forms shown in Figures 1 and 2. The base of the distillation column is provided with a reservoir 18 and draw-off valve 19. A pipe 20 and flow-meter 21 are provided for the injection of steam directly below the lowest plate in the column.

The top of the column 11 is connected through pipe 22 to a water-cooled condenser 23 and the outlet from the condenser is connected by pipe 24 to a collecting vessel 25, the base of which is connected by pipe 26 and valve 27 to a separating vessel 28 provided with a draw-off valve 29. Vessels 25 and 28 are both connected by pipes 30 and 31 and valve 32 to a vacuum pump or compressor (not shown).

When the apparatus is operated for the stripping of butadiene and styrene from the crude latex formed by their copolymerisation the whole apparatus is maintained under a vacuum by a vacuum pump connected to pipe 30. Latex is introduced to vessel 4 through pipe 5 and steam is introduced in the desired proportion through pipe 7. Under the influence of the steam and the reduced pressure the latex immediately froths and the latex foam is carried from the vessel 4 through pipe 9 into the distillation column 11.

As a result of the velocity with which the foam is sucked into the column 11 from the pipe 9 the foam is broken by impact on the side of the column and latex falls onto the top plate 14 of the column. After the appropriate hold-up the latex decants through downcomer 13 onto the first perforated plate 12 of the column. During the residence time of the latex above the plate 14 disengagement of steam and vapourisation of styrene and butadiene occurs. This distillate is carried through pipe 22 to condenser 23 where the steam and styrene are condensed to liquid and are collected in vessel 25. From vessel 25 they run into vessel 28 where the water layer is separated from the styrene. As an alternative, decantation may be effected by suitable means in one vessel only and the styrene and water removed separately by pumping. Butadiene vapour is recovered by further cooling and compression and the compressors may also provide the means for evacuation of the apparatus, being connected through pipe 30.

The latex passing through downcomer 13 passes through the succeeding plates of the column into reservoir 18. The plates in the column have the size and number of perforations fixed by the degree of hold-up and mixing required. The dimensions of the downcomer and its position in relation to the plate are also fixed by the degree of hold-up required. These dimensions, as well as the height of the column and the spacing and number of perforated plates, are fixed by the same considerations.

The residual monomers in the latex are removed by the injection of a further quantity of steam into the bottom of the column 11 through pipe 20. Steam thus passes up the column in counter-current flow to the downcoming latex. When this steam contacts the latex foaming again occurs to some extent, resulting in a proportion of the latex being carried back up the column with the distillate. This mixture of distillate and foamed latex on reaching plate 14 is carried up through pipe 16 where it contacts the incoming mixture of latex and steam, whereupon all the froth is simultaneously broken and the latex carried up pipe 16 is returned down the column.

A butadiene-styrene co-polymer latex in which monomer conversion had been carried to 66% was passed through this apparatus at the rate of nine gallons per hour. Steam was introduced through pipe 7 at the rate of 14.5 lbs. per hour and into the bottom of the column through pipe 20 at the rate of 9.5 lbs. per hour. The measured pressure in receiving vessel 25 was five inches of mercury (absolute) and in the latex reservoir 18 nine inches of mercury. Under continuous operating conditions the styrene content of the latex collected in reservoir 18 was less than 0.5% calculated on the rubber and the theoretical amount of styrene was recovered by decantation from the water. A compressor on the line 30 was used for recovery of the butadiene when this was required.

Figure 4:
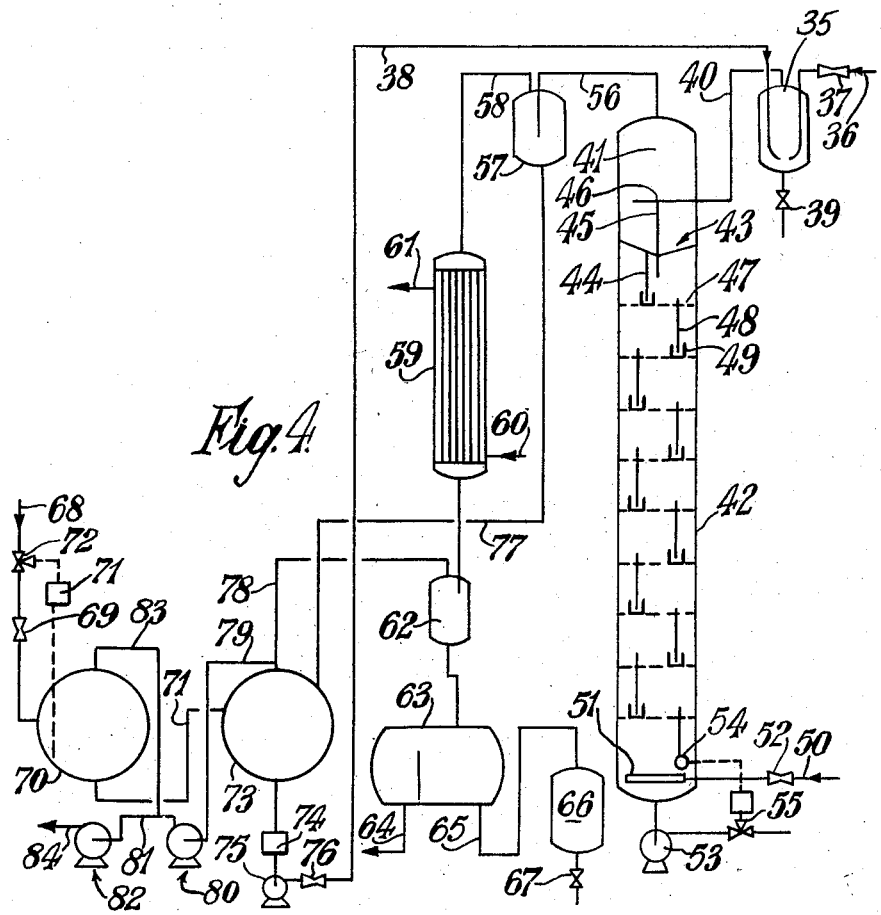

Referring to Figure 4, this shows diagrammatically the lay-out of a plant for continuously stripping styrene from crude butadiene-styrene copolymer latex. The apparatus comprises a mixing vessel 35, similar to that of Figure 3, provided with a steam inlet pipe 36 and flow-meter 37 and also a latex feed pipe 38. The vessel is drained by valve 39 while the outlet pipe 40 is connected with the top chamber 41 of distillation column 42. The base of the top chamber 41 is constituted by a funnel-shaped imperforate top plate 43 situated a distance below the top of the column corresponding to three plate intervals which is provided with a central pipe 45 and a liquid transfer conduit or downcomer 44 arranged near the centre. The pipe 45 joins pipe 40 in a T-piece 46 which is preferably of the design shown in Figure 2. The remaining plates 47 in the column are perforated and are each provided with a downcomer 48; all of the downcomers, including 44, project slightly above the level of the plate and terminate in a cup 49, thereby providing a path for fluid descending the column. As previously mentioned, however, other types of plates or fillings can be used. A steam pipe 50 is provided at the base of the column for injecting steam through a perforated ring 51 via flow meter 52. The diameter of ring 51 is such that it provides an even distribution of steam over the column. The stripped latex accumulating in the base of the column is removed to storage by pump 53 and the level of latex in the column is controlled by a float 54 operating on control mechanism 55.

The top outlet of column 42 is connected by pipe 56 to a foam trap 57, the upper outlet of which is connected by pipe 58 to water-cooled condenser 59 having water inlet and outlet 60 and 61, respectively. The outlet of the condenser is connected to vacuum drum 62 the lower outlet of which leads to a styrene decanter 63. The upper outlet 64 of this decanter conducts the recovered styrene to storage while the lower outlet 65 leads to a decanted water receiver 66 having a drain valve 67.

The crude latex is supplied to the apparatus through pipe 68 and flow meter 69 to butadiene flash tank 70, the level in this tank being controlled automatically by controller 71 acting on valve 72. The lower outlet of tank 70 is connected by pipe 71a to a vacuum flash tank 73 which is provided with an outlet leading to latex filter 74 and pump 75 whence the latex is fed to mixing tank 74 through flow meter 76 and pipe 38. Flash tank 73 is provided with two upper outlets, one of these being pipe 77 which connects with foam trap 57 and the other being pipe 78 which connects with vacuum drum 62. Flash tank 73 is also connected by pipe 79 to vacuum pump 80 which serves to evacuate the whole system. The discharge from vacuum pump 80 is fed through line 81 to a compresser 82, which also draws vapour from butadiene flash tank 70 through pipe 83, and the compressed butadiene is discharged through pipe 83, and the compressed butadiene is discharged through pipe 84 to a condenser and storage vessels (not shown).

In operation of the apparatus crude polymer latex containing butadiene and styrene monomers is supplied through pipe 68.

Whilst butadiene is highly volatile and the unreacted monomer does not therefore require to be steam distilled from the latex, the process for its removal is complicated by the fact that when the latex is vented to atmospheric or reduced pressures the boiling off of residual butadiene causes excessive foaming. The latex is therefore introduced at a controlled rate into flash tank 70 of large capacity where a substantial part of the monomer is drawn off via compressor 82 in which it is compressed to a pressure of about 60 lbs./sq.in., subsequently liquefied in a water cooled condenser and passed to storage. By means of the compressor the pressure in tank 70 is maintained at approximately 3 lbs./sq.in. (gauge)

From tank 70 the latex, still containing some butadiene, is drawn to the second flash tank 73 which by means of vacuum pump 80 is maintained at a pressure of approximately 220 mm. mercury (absolute). In order to recover the butadiene removed by the vacuum pump, the output of this pump is fed into the input of compressor 82 so that all the butadiene is delivered to the condenser at a pressure of 60 lbs./sq. in.

From the butadiene recovery equipment the latex, still containing the majority of the unreacted styrene, is fed continuously to the styrene stripping apparatus from vessel 73 by pump 75, via pipe 38 to mixing vessel 35. At the same time saturated steam is introduced in the desired proportion through pipe 36 and flowmeter 37. The open ends of pipes 36 and 38 are spaced apart and face each other thus ensuring efficient mixing of steam and latex without the need for mixing in a pipe from which it would be more difficult to remove the coagulum. Under the influence of steam and reduced pressure, the latex immediately froths and the latex foam is carried from vessel 35 through pipe 40 into the distillation column 42 which is also under reduced pressure. The open end of pipe 40 faces the wall of the column and is separated by a short distance from it.

As a result of the velocity with which the foam is sucked into the column 42 from the pipe 40, the foam is broken by impact on the side of the column and latex falls on to the top plate 43 of the column. If the T-piece 46 is of the type shown in Figure 1 or 2 any tendency for incoming latex to fall down the column instead of issuing from the end of pipe 40 above plate 43 is eliminated and, as will be appreciated later, some additional opportunity is given for disengagement of monomer from this incoming latex before it is mixed with more effectively stripped latex returned from the lower part of the column.

Latex entering the column from pipe 40 runs on to plate 43 and decants through pipe 44 on to the first perforated plate 47 of the column. During the residence time of the latex above plate 43, steam, styrene vapour and any residual butadiene are disengaged. This distillate is carried through pipe 56 through foam trap 57 to condenser 59 where the steam and styrene are condensed to liquid which passes through vacuum drum 62 and collects in vessel 63. The outlet from foam trap 57 leads back to butadiene vacuum flash tank 73 so that any latex which may be carried over through accidental faulty operation of the equipment is recycled. In normal operation no foaming over of the latex occurs.

Vessel 63 is so designed, as shown schematically on the drawing, that the upper styrene layer is separated continuously from the lower water layer and each is pumped off for suitable disposal, the styrene through line 64 and the water through line 65 and vessel 66. Butadiene vapour is sucked into vacuum pump 80 which must be suitably designed for such service (e. g. a Nash-Hytor water sealed rotary pump is commonly used) and thence is delivered to compressor 82 and the remainder of the butadiene recovery equipment.

Any styrene which has not been condensed by condenser 59 is separated by suitable means from the butadiene vapour.

Returning to distillation column 42, the latex decanted from plate 43 passes through downcomer 44 on to perforated plate 47 and down the column through the remaining plates. The size of the perforations in the plates is primarily conditioned by the degree of mixing required. Each plate is equipped with a downcomer and sealing means of the type already described. The dimensions of the downcomer and its position in relation to the place are primarily fixed by the degree of hold-up required. The number of perforated plates is fixed by similar considerations. The plate spacing is fixed by the height required to ensure adequate disengagement of vapour from the liquid.

The residual monomer in the latex is removed by the injection of a further quantity of saturated steam at the foot of the column below the last plate through pipe 50. This steam passes up the column in counter-current flow to the downcoming latex, thus removing the last traces of styrene. When this steam contacts the latex foaming again occurs to some extent, resulting in a proportion of the latex being carried back up the column with the distillate. The mixture of distillate and foam thus transferred from plate 47 to plate 43 is carried up through pipe 45 and thence in pipe 40 if a T-piece of the preferred type is used. On issuing from the open end of pipe 40 it strikes against the side of the column whereupon the foam is killed and the distillate is disengaged.

While from theoretical considerations the mixing of untreated latex with the distillate would appear to be undesirable, since it is contrary to normal practice, it has been found that considerable advantages are obtained in the breaking of the foam and the consequent disengagement of vapour therefrom.

The stripped latex accumulates at the bottom of the column whence it is pumped off to storage by pump 53. The level of latex at the foot of the column is controlled by means of liquid level controller 55 and, to contribute further to the efficiency of the stripping operation, the steam injection ring is preferably situated below this level.

A butadiene styrene copolymer latex in which monomer conversion had been carried to 66% having an adjusted pH of 8.0 and residual butadiene content of about 2% was passed through this apparatus at the rate of three gallons per hour. The latex delivered from the butadiene recovery system was at a temperature of 50° C. Desuperheated steam at 15 lbs./sq. in. (gauge) was introduced through pipe 36 at the rate of 1.5 lbs./hr. and into the bottom of the column via pipe 50 at 7.1 lbs./hr. The measured pressure at the top of the column was 90 mm. mercury absolute and the temperature of the latex in the column was 53° C.

Under continuous operating conditions the residual styrene content of the latex drawn off at the foot of the column was less than 0.2%, calculated on the dry rubber content of the latex, and the residual butadiene content was nil.

It will be appreciated, of course, that the total steam requirement for complete removal of styrene will depend on the inlet temperature of the latex, the degree of vacuum in the equipment and on other like considerations. Furthermore, the equipment may be used for removal of other monomers of low volatility and the steam requirement will vary according to the physical properties of these monomers.

The examples given above are illustrative only and conditions may be further varied, depending on the type of latex being processed, e. g. the ratio of steam introduced at the bottom of the column to that introduced at the top may be varied to suit specific conditions.

It will also be apparent that the size of the equipment and the latex and steam throughput rate will be conditioned by the degree of hold-up required, i. e. by the attainment of correct equilibrium conditions between vapour and liquid and smooth passage of latex through the column.

Having now described my invention, what I claim is:

1. A process for stripping residual monomers from crude polymers which comprises subjecting the crude polymer to the counter flow of steam in a distillation column maintained under reduced pressure, mixing part of the total steam required for stripping with the crude polymer entering the system to form a foam, conducting the resulting foam to a chamber at the top of the distillation column, mixing said foam with substantially the whole of the vapors from said column and projecting the resulting mixture onto an internal surface of said chamber.

2. A process according to claim 1 in which the said foam is used to aspirate the said distillate from the top of the column.

3. A process according to claim 1 in which the mixing of the steam and crude polymer is effected by introducing them separately into a mixing vessel in such manner that the incoming streams enter the vessel at spaced apart positions facing each other.

4. A process according to claim 1 in which the crude polymer is subjected to reduced pressure for removal of monomer volatile at atmospheric temperatures prior to mixing with steam.

5. A process according to claim 1 in which the crude polymer comprises an aqueous suspension of a copolymer of a diolefine and a relatively non-volatile vinyl compound copolymerizable therewith which suspension contains free monomers.

6. Apparatus for stripping residual monomers from crude polymers by counter-current flow of steam in a distillation column maintained under reduced pressure, which comprises, in combination, a distillation column having steam inlet means at the foot thereof, an imperforate top plate with liquid transfer means adapted to be sealed with liquid and a chamber situated above said imperforate top plate, a conduit for conducting distillate through said imperforate plate, a mixing vessel with inlets for steam and crude polymer, a conduit connecting the mixing vessel with said conduit for conducting distillate through the imperforate plate and having the outlet thereof arranged to discharge onto an internal surface of said chamber.

7. Apparatus according to claim 6 wherein said column has a chamber above said imperforate plate and wherein the conduit for conducting distillate through said imperforate plate comprises a substantially vertical pipe passing through the central portion of the imperforate top plate and terminating within the said chamber in a substantially horizontal portion joined to the conduit from said mixing vessel.

8. Apparatus according to claim 7 wherein the conduit from the mixing vessel terminates in a nozzle positioned to aspirate distillate through the said conduit and to project it against a surface within said chamber.

9. Apparatus according to claim 6 wherein the steam and crude polymer supply pipes in the mixing vessel terminate in outlets spaced apart and facing each other.

10. Apparatus according to claim 6 wherein the distillation column is a plate column.

11. Apparatus according to claim 6 comprising means for subjecting crude polymer to reduced pressure at atmospheric temperature and removing volatile monomer therefrom prior to distillation.

12. Apparatus which comprises a mixing vessel, means for introducing steam and crude polymer separately into said vessel by means of pipes having facing openings spaced apart, a distillation column of the perforated plate type with a top imperforate plate of shallow funnel shape spaced at a distance from the top of said column corresponding to a few plate intervals, steam inlet means at the foot of the distillation column, means for conducting the mixture of steam and crude polymer from the mixing vessel to an entry point in the distillation column above said top plate for discharge against the wall of said column, a conduit projecting through said top plate and connecting with said mixture conducting means, a condenser, a receiving vessel connected with said condenser, means for conveying distillate from the column to the condenser and means for reducing the pressure in the distillation column and in the mixing vessel.

References Cited in the file of this patent

UNITED STATES PATENTS

| 460,365 | Schalitz | Sept. 29, 1891 |
| 2,224,984 | Potts | Dec. 17, 1940 |

FOREIGN PATENTS

| 581,185 | Great Britain | Oct. 3, 1946 |